United States Patent Office 3,507,370
Patented Apr. 21, 1970

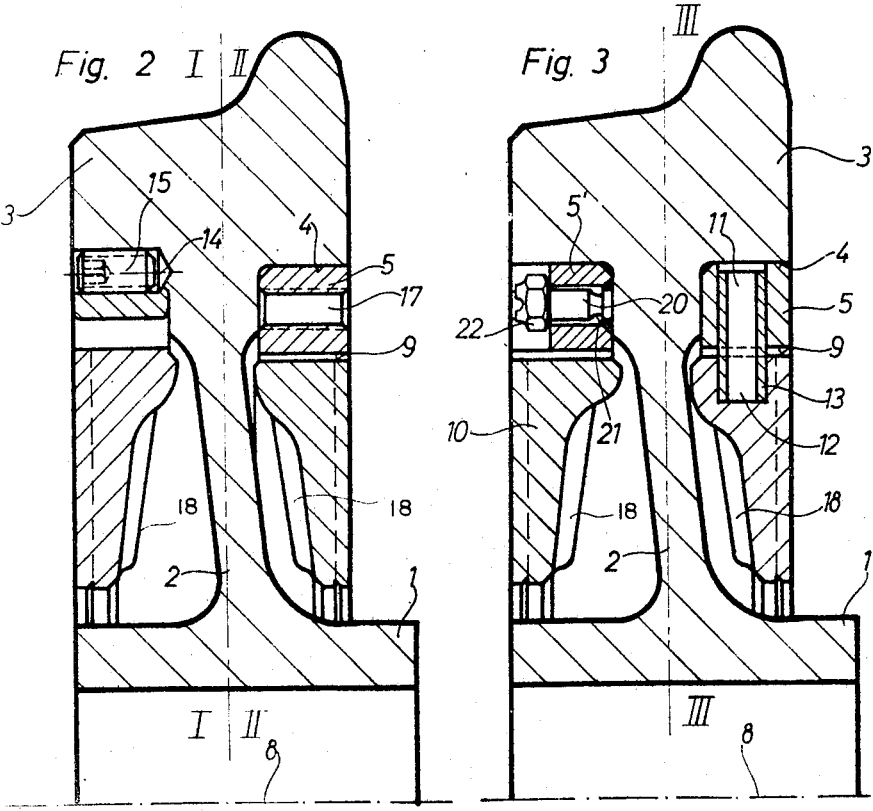

3,507,370
BRAKE DISK FOR RAILWAY VEHICLE WHEELS
Eberhard Falch, Munich, Germany, assignor to Knorr-Bremse G.m.b.H., Munich, Germany, a limited liability company of Germany
Filed Dec. 3, 1968, Ser. No. 780,834
Claims priority, application Germany, Feb. 2, 1968, 1,605,855
Int. Cl. F16d 65/12
U.S. Cl. 188—218                                    6 Claims

ABSTRACT OF THE DISCLOSURE

A railway vehicle wheel having a rim has a carrier ring seated within the rim by a press fit. A brake disk is located within the carrier ring and has its outer periphery spaced from the inner face of the carrier ring. Retaining pins have their ends seated in the brake disk and extend radially outwardly into the carrier ring. As a modification, the carrier ring may be mounted on a number of threaded bolts welded to the wheel and parallel to the axis of the wheel.

---

The present invention relates to brake disks for railway vehicle wheels, more particularly, to rigidly and securely mounting a brake disk within the rim of a railway wheel while providing space for thermal expansion of the brake disk.

In disk brakes for railway vehicles a braking force is exerted against brake disks which are fixedly mounted to the wheel or to the axle supporting the wheels. Brake disks have been mounted on wheels by fastening members which required bores or holes in the wheels. However, the presence of these holes weakened the wheels and hence were not satisfactory. Brake disks have also been attached to the hub of the railway wheel by special spring elements. At the outer periphery of such a brake disk cams are provided which cooperate with retaining pins that are moved radially into the rim or tire of the wheel. This construction of mounting a brake disk results in accurate positioning of the disk with respect to the center of the wheel and also provides for adequate thermal expansion of the brake disk together with safe transmission of the braking moment at the outer periphery of the brake disk. However, this construction is rather expensive because of the necessity for providing the guiding structures.

In another form of mounting a brake disk the disk is sprung into the braking position only along its outer periphery under the action of axially applied forces. In order to permit thermal expansion, there is a space between the outer periphery of the brake disk and the inner periphery of the surrounding portion of the wheel. An interlocking torque coupling is provided between the wheel rim and the brake disk. While this brake disk is characterized by a relatively simple construction, it does require special manufacturing operations for its assembly and lacks any dependable and accurate centering structure.

Brake disks have also been shrunk or press fit directly within the tire or rim of a railway vehicle wheel. In some cases the brake disk has been secured in position by spot welding. However these constructions are relatively unsatisfactory since there is no provision for thermal expansion of the brake disk.

It is therefore the principal object of the present invention to provide a novel and improved mounting of a brake disk on a railway vehicle wheel.

It is another object of the present invention to provide a simple and relatively inexpensive mount for a brake disk on a railway vehicle wheel which also provides accurate centering and has freedom for thermal expansion of the disk.

It is a further object of the present invention to provide a mounting for a brake disk on a railway vehicle wheel where the mounting is rigid in the axial direction and the braking moments are transmitted by a minimum application of force.

In one form of the present invention a carrier ring may be rigidly mounted within the inner periphery of the rim or tire of a railway wheel, such as by a press or a shrink fit. A brake disk is positioned within the carrier ring and has its outer periphery spaced inwardly of the inner peripheral surface of the carrier ring. A plurality of retaining pins have their ends seated in the outer periphery of the brake disk and extend radially outwardly into the carrier ring. With this structure the brake disk is rigidly connected upon the railway vehicle wheel but has its outer peripheral surface spaced slightly from the carrier ring so as to provide for thermal expansion.

Other objects and advantages of the present invention will be apparent upon reference to the accompanying description when taken in conjunction with the following drawings, wherein:

FIG. 2 is a radial sectional view with its left half being taken along the line I—I of FIG. 1 and its right half being taken along the line II—II of FIG. 1;

FIG. 3 is a radial sectional view with its right half being taken along the line III—III of FIG. 1 and its left half being similar to the left half of FIG. 2 but showing a modification.

Proceeding next to the drawings wherein like reference symbols indicate the same parts throughout the various views a specific embodiment and modification of the present invention will be described in detail.

Figure 1:
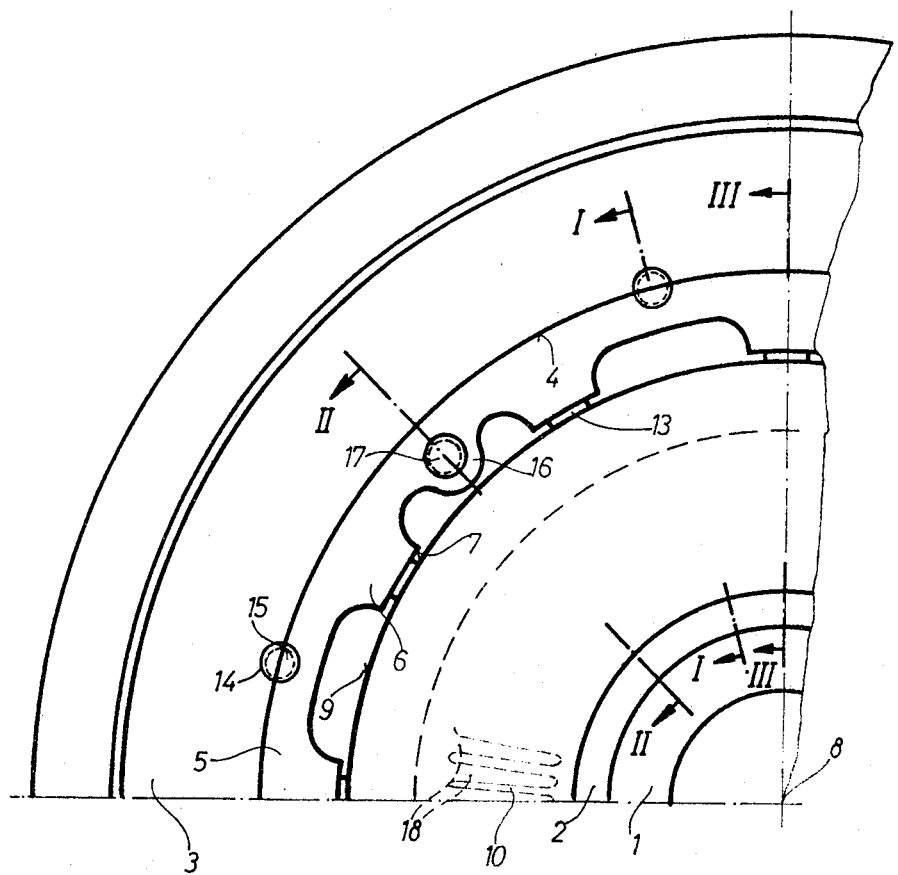
FIG. 1 is a view in the axial direction of a portion of the face of a railway vehicle wheel having a brake disk mounted thereon according to the present invention.

In the drawings there is shown a unitary integral railway vehicle wheel having a hub 1 from which extends radially outwardly a disk section 2 surrounded by a rim 3. Within the inner peripheral surface 4 of the wheel rim 3 a steel carrier ring 5 is rigidly mounted by means of a press or shrink fit. The outer peripheral of the steel carrier ring is thus in tight contact with the inner periphery 4 of the wheel rim.

The inner peripheral surface of carrier ring 5 is provided with a plurality of uniformly spaced projections 6 which extend radially inwardly and whose inner ends 7 define a cylinder that is coaxial with the rotational axis 8 of the wheel. The cylinder defined by the inner ends 7 is located a slight distance radially outwardly from the outer peripheral surface 9 of a brake disk 10 formed of gray cast iron.

Each carrier ring projection 6 is traversed by a radial bore 11 which is aligned with a corresponding terminal bore 12 formed in the outer peripheral surface of the brake disk 10. Cylindrical sleeves 13 are positioned in each of the aligned bores 11 and 12 and function as retaining pins. It will be apparent that from this construction the brake disk 10 is not supported from either the hub 1 or the disk section 2 of the vehicle wheel.

As may be seen in FIGS. 1 and 2 threaded bores 14 parallel to the rotational axis of the vehicle wheel are provided between the contacting surfaces of the wheel rim 3 and the carrier ring 5 and located mid-way between the projections 6. Threaded plugs 15 are screwed into the internally threaded bores 14. Carrier ring 5 is also provided with inwardly projecting portions 16 between projections 6 with there being threaded bores 17 in portions 16 for receiving threaded eyebolts or the like on axes parallel to the rotational axis 8 of the vehicle wheel. These threaded bolts facilitate removal of the carrier ring from the vehicle wheel.

In mounting the brake disk according to the present invention the carrier ring 5 is first connected with the brake disk 10 by the retaining pins 13. The assembly of the carrier ring, retaining pins and brake disk is then seated into position on the vehicle wheel as illustrated in the drawings. The threaded bores 14 are then formed and bolts 15 screwed into them.

During braking, braking torque is transmitted by the brake disk 10 through the retaining pins 13 to the carrier ring 5 and to the vehicle wheel through the tightly fitted outer peripheral surface of the carrier ring with the inner peripheral surface of the wheel rim. Threaded bolts 15 will prevent any slipping between the inner peripheral surface 4 of the wheel rim and the carrier ring. It is pointed out that the torque is transmitted at the outer peripheral surface of the brake disk 10 where there is sufficient space for a number of retaining or positioning pins 13. Because of the number of retaining pins which can be provided, each individual pin will transmit only a small portion of the total braking torque.

Should the brake disk become heated by the friction incurred during the braking operation, the brake disk is free to expand radially outwardly toward the projection surfaces 7. At this time the retaining pins 13 will undergo only a slight relative shifting. Since the carrier ring is supported only at its outer peripheral surface, the carrier ring will experience very little, if any, bending stresses and requires no further support from either the wheel disk section 2 of the hub 1.

In order to remove the brake disk assembly, the threaded bolts 15 are removed and eyebolts or the like are threaded into bores 17 to permit a force to be applied to the carrier ring to withdraw the carrier ring from the vehicle wheel.

The inner radial face of the brake disk 10 directed toward the wheel disk section 2 may be provided with a plurality of radially extending ventilating or cooling ribs 18. During rotation of the vehicle wheel cooling air will be drawn in between the hub 1 and the inner periphery of the brake ring 10 to be moved radially outwardly to escape from the lateral openings between the carrier ring 5 and the brake disk 10. The air will be moved radially outwardly between the wheel disk section and the brake disk by centrifugal force.

In the modification illustrated in the left hand half of FIG. 3 a plurality of threaded bolts 20 are welded to a relatively thick periphery of the wheel disk section 2 so as to be parallel to the rotational axis 8 of the wheel. The carrier ring 5' will be provided with a plurality of holes 21 through which the threaded bolts are inserted and the carrier ring is held in position by nuts 22 threaded on the ends of the bolts. In this construction it is not necessary to provide a force fit between the carrier ring and the wheel rim. Also, the threaded bores 14 and 17 and the bolts 15 are not necessary and may be omitted. Except for these modifications, the mounting of the brake disk in FIG. 3 is similar to that as previously described. This modification is advantageous in that the mounting and removal of carrier ring 5 is greatly facilitated by the use of the bolts 20 and nuts 22 to secure the carrier ring in position on the vehicle wheel.

The mounting of a brake disk as disclosed in the present invention is not limited to integral railway wheels as disclosed herein but may also be applied to railway vehicle wheels having a separate rim or tire which is shrunk upon the outer periphery of the wheel.

Thus it can be seen that the present invention has disclosed a simple and inexpensive arrangement for the mounting of a brake disk on a railway vehicle wheel. The brake disk is rigidly held in position upon the wheel but does not depend upon any connection between the disk portion of the wheel or the hub thereof for this rigid mounting. Further, space is provided long the outer peripheral surface of the brake disk for thermal expansion of the disk. The expansion of the brake disk will in no way effect the mounting or the operation of the brake disk.

It will be understood that this invention is subject to modification in order to adapt it to different uses and conditions.

What is claimed is:

1. In a mounting for a brake disk upon a railway vehicle wheel having a rim, a carrier ring being a separate part from the wheel structure rigidly mounted within the inner periphery of a railway wheel rim, axially extending mating grooves in the opposed faces of the carrier ring and wheel rim, means within said grooves for preventing relative rotative movement between the carrier ring and the wheel, a brake disk within said carrier ring and having its outer periphery spaced therefrom, and a plurality of retaining pins having their ends seated in terminal bores in the outer periphery of said brake disk and extending radially outwardly into said carrier ring, said pins having limited axial movement in both directions, only the outer periphery of said brake disk being attached to the wheel.

2. In a mounting as claimed in claim 1 and comprising radially inwardly extending projections on the inner peripheral surface of said carrier ring in the vicinity of said retaining pins, the ends of said projections being spaced slightly outwardly from the outer peripheral surface of said brake disk.

3. In a mounting as claimed in claim 1 with said retaining pins comprising cylindrical sleeves.

4. In a mounting as claimed in claim 1 with said carrier ring being mounted within said wheel rim by a press fit, there being a plurality of threaded bores equally spaced in the radial face of said carrier ring.

5. In a mounting as claimed in claim 1 and comprising a plurality of threaded bolts extending from the wheel and parallel to the axis of the wheel, said carrier ring having a corresponding plurality of holes therein to receive said threaded bolts, and means on the ends of said bolts for holding said carrier ring in position on said bolts.

6. In a mounting as claimed in claim 5 with said threaded bolts having their ends welded to said wheel.

References Cited

UNITED STATES PATENTS

| 3,237,731 | 3/1966 | DuBois | 192—107 X |
| 3,405,784 | 10/1968 | Biabaud | 188—218 |

FOREIGN PATENTS

| 1,311,816 | 11/1962 | France. |
| 11,279 | 9/1885 | Great Britain. |

GEORGE E. A. HALVOSA, Primary Examiner

U.S. Cl. X.R.

192—107